June 9, 1931.  G. M. TURNER  1,809,609
CASTER
Filed Jan. 6, 1928
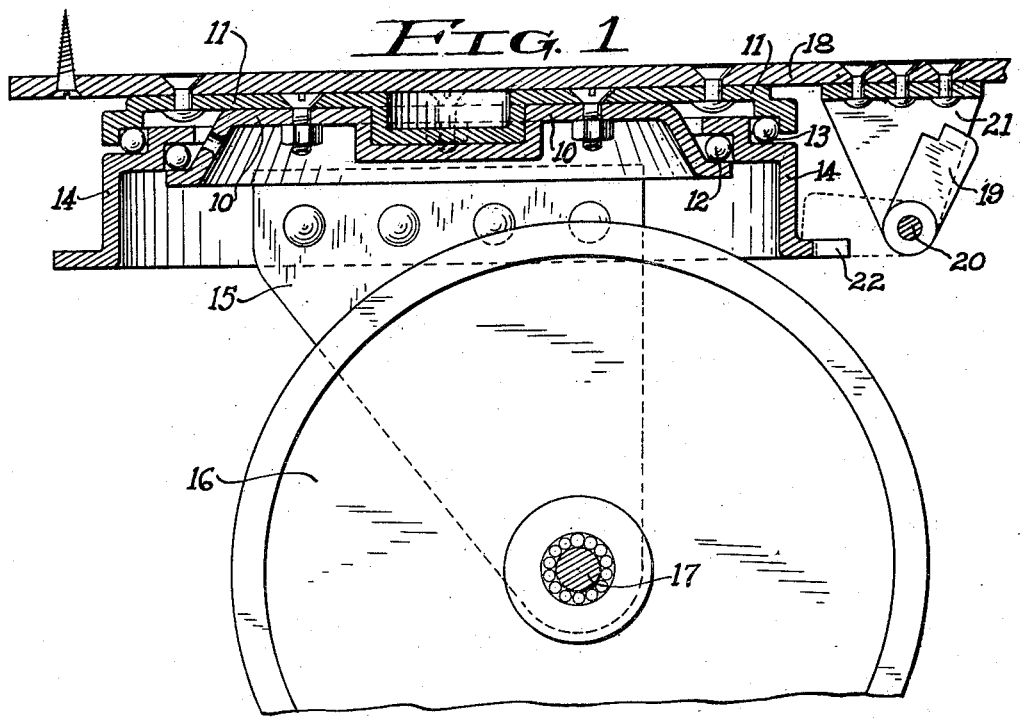
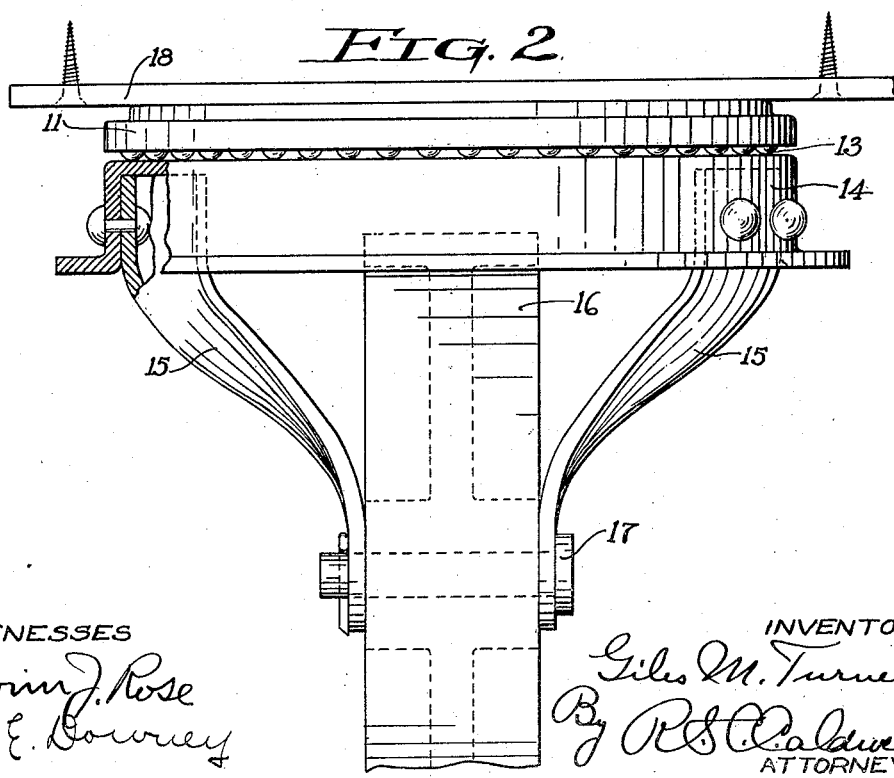
WITNESSES
INVENTOR
ATTORNEY Patented June 9, 1931

1,809,609

UNITED STATES PATENT OFFICE

GILES M. TURNER, OF MILWAUKEE, WISCONSIN

CASTER

Application filed January 6, 1928. Serial No. 244,881.

This invention has for its object to provide a caster suitable for use on industrial trucks and designed to have great strength and freedom from annoyance and still being inexpensive to manufacture, the principal parts thereof with the exception of the wheel being formed of sheet metal stampings.

Another object of the invention is to provide such a caster having a double ball bearing for the swivel support of the wheel, such ball bearing being of approximately the diameter of the wheel to give strength and durability thereto and to insure easy turning of the caster on its swivel connection.

Another object of the invention is to provide such a caster with a lock to prevent it from turning on its swivel connection when desired.

With the above and other objects in view the invention consists in the caster as herein claimed and all equivalents.

Referring to the accompanying drawings in which like characters of reference indicate the same parts in different views, Fig. 1 is a central sectional side elevation of a caster constructed in accordance with this invention, and Fig. 2 is an end view thereof.

In these drawings, 10 indicates a sheet metal disk which is flared and flanged to form a bottom pan which is bolted, riveted or welded to another sheet metal disk 11 on top thereof, said other disk being provided with a flanged annular shoulder and constituting a top pan. The two disks at their flanged edges form ball races for two series of balls 12 and 13 respectively, and between them fits a flanged ring member 14.

The disk members 10 and 11 are preferably made of sheet metal stampings pressed and drawn into shape and likewise the ring 14, which, besides its cylindrical main portion and outwardly extending flange at its lower edge, has an inwardly extending stepped flange at its upper edge, the inner and outer shouldered portions of its stepped flange completing the raceways for the two series of balls 12 and 13. Thus the inner and outer bearings are brought close together on opposite faces of the ring member, giving great strength to the caster and eliminating any tendency to dish or distort the ring member. The ring member is held between ball bearings of large diameter so that it is free to turn under all conditions and with any load. Its cylindrical form with inwardly extending stepped flange gives it great strength and this is further increased by the outwardly extending lower flange.

Riveted or otherwise permanently secured to the cylindrical portion of the ring member 14 with their upper edges abutting against the shoulder formed by the upper flange thereof are a pair of bracket members 15 curved to conform with the curvature of the ring and converging to form the cheek plates on either side of the wheel 16, which is mounted with roller bearings on the pin 17 connecting said cheek members. The bracket members are of such shape as to place the axis of the wheel a sufficient distance behind the axis of the turntable formed by the ring as to cause the wheel to trail in the manner usual with casters.

While the upper pan 11 may be secured directly to the truck or other body to be mounted on the casters, it is preferably riveted or bolted to a gusset plate 18, which may be of any shape and adapted for attachment to the truck bottom and thus give a broader bearing for the caster than would be possible with the pan directly connected and making it more convenient to attach the caster to the truck. When it is desirable to lock the caster against turning, as when the truck is to be used as a trailer and it is therefore desired that the rear wheels should not swivel, it may be provided with a latch consisting of a dog member 19 carried by a turning rod 20, which is pivotally mounted in an angular bearing bracket 21 secured to the bottom of the gusset plate 18, such dog having a notched edge to engage in a notch 22 in the edge of the outwardly extending flange at the lower edge of the ring 14. The dog is normally in the raised position, as shown in full lines in Fig. 1, where it will be held by gravity, but when carried over the center it will then be held by gravity on the outwardly extending flange of the ring member until the notch thereof comes into register with the dog, when the dog will fall into the notch and lock the ring member against further turning until the dog is again raised.

By means of this invention a caster is produced having great strength, suiting it for the particular purpose of industrial truck use, where such strength is necessary and still the cost of production is reduced to a minimum by reason of the use of inexpensive sheet metal stampings to produce the turntable. The positioning of the upper and lower ball bearings against opposite surfaces of the ring member provides an added element of strength of greatest importance in a device of this character and assures a free turning bearing under all loads and under all angles of stress to adapt the caster to readily respond and serve its intended functions. The bracket members are strengthened by their curvature and harmonize with the other structure in the production of a strong and durable caster.

The locking feature is one having its advantages, as pointed out, and provides an added use for the outwardly extending strengthening flange at the lower edge of the ring member.

An element of strength in the present construction exists by reason of the disks 10 and 11 being connected together by fastening means extending over a considerable area instead of relying on a single center pin and for greater rigidity in this connection it is obvious that these two plates may be embossed so that the boss pressed out from one fits in the cavity produced incident to the formation of the boss on the other.

Furthermore, the use of side bracket members 15 formed of separate stampings enables the turntables to be standardized for several sizes of casters and the different sized wheels accommodated by the use of side plates of different lengths, thus materially reducing the stock necessary to be kept on hand to supply various sizes.

For convenience the lower pan 10 may be provided with an opening to receive the nozzle of a grease gun whereby lubricant may be injected into the cavity between the flanges of the two plates, where it will supply both ball races as needed.

The cylindrical shape of the ring member 14 with its inwardly projecting flange joining it with a cylindrical shoulder of smaller diameter also provided with an inwardly projecting flange presents a shape resembling that of a stepped pulley wherein cylindrical surfaces of successively smaller diameter are connected by plane surfaces. The term "stepped" is therefore chosen to express the analogy and inasmuch as the ring is formed of sheet metal the stepped formation occurs on both sides thereof affording inner and outer bearing shoulders to form the respective ball races with the flanges of the two disk members 10 and 11. The expression "cylindrical ring member having a stepped flange", as employed herein, is used for convenience to express this condition.

What I claim as new and desire to secure by Letters Patent is:

1. A caster comprising a ring member having a stepped inwardly extending annular flange forming inner and outer bearing shoulders, a pair of disk members secured together and flanged to complete inner and outer ball raceways with said bearing shoulders of the ring member, bearing balls in said ball raceways, curved bracket plates secured within the ring member and bearing against the flange thereof, and a wheel mounted between the bracket plates.

2. A caster comprising a ring member having a stepped inwardly extending annular flange forming inner and outer bearing shoulders, a pair of disk members secured together and shouldered and flanged to complete inner and outer ball raceways with said bearing shoulders of the ring member, bearing balls in said ball raceways, an outwardly extending strengthening flange at the lower edge of the ring member, curved bracket plates secured within the ring member and bearing against the upper flange thereof, a wheel mounted between the bracket members, a gusset plate secured to the disk members, a bearing bracket on the gusset plate, and a dog mounted on the bearing bracket and adapted to rest on the outwardly extending flange, said flange having a notch to receive the dog for locking the ring member against turning.

In testimony whereof, I affix my signature.

GILES M. TURNER.